(12) United States Patent
Langoju et al.

(10) Patent No.: US 12,488,438 B2
(45) Date of Patent: Dec. 2, 2025

(54) DEEP LEARNING-BASED IMAGE QUALITY ENHANCEMENT OF THREE-DIMENSIONAL ANATOMY SCAN IMAGES

(71) Applicant: GE Precision Healthcare LLC, Milwaukee, WI (US)

(72) Inventors: Rajesh Veera Venkata Lakshmi Langoju, Bengaluru (IN); Utkarsh Agrawal, Bengaluru (IN); Bipul Das, Chennai (IN); Risa Shigemasa, Tokyo (JP); Yasuhiro Imai, Tokyo (JP); Jiang Hsieh, Brookfield, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 626 days.

(21) Appl. No.: 17/403,017

(22) Filed: Aug. 16, 2021

(65) Prior Publication Data

US 2023/0052595 A1 Feb. 16, 2023

(51) Int. Cl.
*G06T 5/73* (2024.01)
*G06T 3/4046* (2024.01)
(Continued)

(52) U.S. Cl.
CPC .............. *G06T 5/73* (2024.01); *G06T 3/4046* (2013.01); *G06T 3/4053* (2013.01); *G06T 5/50* (2013.01);
(Continued)

(58) Field of Classification Search
None
See application file for complete search history.

(56) References Cited

U.S. PATENT DOCUMENTS

2022/0058438 A1* 2/2022 Prince .................. G06T 5/73

FOREIGN PATENT DOCUMENTS

WO WO-2019097085 A1 * 5/2019 .......... G06T 3/4053

OTHER PUBLICATIONS

Hsieh, Jiang, et al. "Reconstruction Technique for Focal Spot Wobbling." Medical Imaging VI: Image Processing, vol. 1652, SPIE, 1992, pp. 175-182. www.spiedigitallibrary.org, https://doi.org/10.1117/12.59424. (Year: 1992).*

(Continued)

*Primary Examiner* — Matthew C Bella
*Assistant Examiner* — Johnny B Duong
(74) *Attorney, Agent, or Firm* — Amin, Turocy & Watson, LLP

(57) ABSTRACT

Techniques are described for enhancing the quality of three-dimensional (3D) anatomy scan images using deep learning. According to an embodiment, a system is provided that comprises a memory that stores computer executable components, and a processor that executes the computer executable components stored in the memory. The computer executable components comprise a reception component that receives a scan image generated from 3D scan data relative to a first axis of a 3D volume, and an enhancement component that applies an enhancement model to the scan image to generate an enhanced scan image having a higher resolution relative to the scan image. The enhancement model comprises a deep learning neural network model trained on training image pairs respectively comprising a low-resolution scan image and a corresponding high-resolution scan image respectively generated relative to a second axis of the 3D volume.

20 Claims, 12 Drawing Sheets

(51) Int. Cl.
  G06T 3/4053 (2024.01)
  G06T 5/50 (2006.01)
(52) U.S. Cl.
  CPC ............... *G06T 2207/10081* (2013.01); *G06T 2207/10088* (2013.01); *G06T 2207/20081* (2013.01); *G06T 2207/20084* (2013.01); *G06T 2207/30004* (2013.01)

(56) References Cited

OTHER PUBLICATIONS

McCollough, Cynthia H., et al. "Spatial Resolution Improvement and Dose Reduction Potential for Inner Ear CT Imaging Using a Z-axis Deconvolution Technique." Medical Physics, vol. 40, No. 6Part1, Jun. 2013, p. 061904. DOI.org (Crossref), https://doi.org/10.1118/1.4802730. (Year: 2013).*

Jurek, Jakub, et al. "CNN-Based Superresolution Reconstruction of 3D MR Images Using Thick-Slice Scans." Biocybernetics and Biomedical Engineering, vol. 40, No. 1, Jan. 2020, pp. 111-125. ScienceDirect, https://doi.org/10.1016/j.bbe.2019.10.003. (Year: 2020).*

Armanious, Karim, et al. "MedGAN: Medical Image Translation Using GANs." Computerized Medical Imaging and Graphics, vol. 79, Jan. 2020, p. 101684. arXiv.org, https://doi.org/10.1016/j.compmedimag.2019.101684. (Year: 2020).*

Leng, S., et al. "Ultra-High Spatial Resolution, Multi-Energy CT Using Photon Counting Detector Technology." Proceedings of SPIE—the International Society for Optical Engineering, vol. 10132, Feb. 2017, p. 101320Y. PubMed Central, https://doi.org/10.1117/12.2255589. (Year: 2017).*

Shilling, Richard Z., et al. "A super-resolution framework for 3-D high-resolution and high-contrast imaging using 2-D multislice MRI. " IEEE transactions on medical imaging 28.5 (2008): 633-644. (Year: 2008).*

Park, Junyoung, et al. "Computed tomography super-resolution using deep convolutional neural network." Physics in Medicine & Biology 63.14 (2018): 145011. (Year: 2018).*

Zhang, Yulun, et al. "Residual dense network for image super-resolution." Proceedings of the IEEE conference on computer vision and pattern recognition. 2018. (Year: 2018).*

Zhao, Can, et al. "Applications of a deep learning method for anti-aliasing and super-resolution in MRI." Magnetic resonance imaging 64 (2019): 132-141. (Year: 2019).*

Scherrer, Benoit, Ali Gholipour, and Simon K. Warfield. "Super-resolution reconstruction to increase the spatial resolution of diffusion weighted images from orthogonal anisotropic acquisitions." Medical image analysis 16.7 (2012): 1465-1476. (Year: 2012).*

Hong, Yoonmi, et al. "Reconstructing high-quality diffusion MRI data from orthogonal slice-undersampled data using graph convolutional neural networks." MICCAI 2019: 22nd International Conference. Springer International Publishing, 2019. (Year: 2019).*

Bhatia, Kanwal K., et al. "Super-resolution reconstruction of cardiac MRI using coupled dictionary learning." 2014 IEEE 11th International Symposium on Biomedical Imaging (ISBI). IEEE, 2014. (Year: 2014).*

Zhao, Xiaole, et al. "Isotropic MRI Reconstruction with 3D Convolutional Neural Network." Proc. Intl. Soc. Mag. Reson. Med. 28 (2020). https://cds.ismrm.org/protected/20MProceedings/PDFfiles/3479.html. (Year: 2020).*

Zhang, Y. et al | "Residual dense network for image super-resolution", In Proceedings of the IEEE conference on computervision and pattern recognition, 2018, 10 pages.

Park, J. et al | "Computed tomography super-resolution using deep convolutional neural network", Physics in Medicine &Biology, Jul. 2018, vol. 63, No. 14, 14 pages.

Park, S. et al | "Deep learning algorithm for reducing CT slice thickness: effect on reproducibility of radiomic features in lung cancer", Korean journal of radiology, Oct. 2019, 10 pages.

* cited by examiner

Enhancement Model Training

Example:
- Corresponding High resolution sagittal/coronal slices (i.e. Z-Axis)
- Slice Thickness (ST): 0.625mm
- Slice Spacing (SS): X mm or 0.5X Example:
- Low resolution sagittal/coronal slices (i.e. Z-Axis)
- Slice Thickness (ST): 1.25mm
- Slice Spacing (SS): X mm Input Output Input Output

DEEP LEARNING-BASED IMAGE QUALITY ENHANCEMENT OF THREE-DIMENSIONAL ANATOMY SCAN IMAGES

TECHNICAL FIELD

This application relates to medical image processing and more particularly to deep learning-based image quality enhancement of three-dimensional (3D) anatomy scan images.

BACKGROUND

Many applications in computed tomography (CT) imaging, magnetic resonance imaging (MRI) and other 3D clinical imaging modalities demand excellent high-contrast spatial resolution. For example, the ability to visualize small structures is necessary when trying to locate small pulmonary nodules, visualizing the temporal bone, imaging small caliber coronary artery stents, or assessing bone fractures to determine a course of treatment.

The spatial resolution of the CT image is mainly determined by the size of the detector elements, as defined by the detector spacing and detector pitch. Although the spatial resolution can be improved by reducing the detector width and inter-detector distance, development of new detectors is time-intensive and incurs a high cost. In addition, smaller detector elements lead to an increase of noise. The image resolution can also be improved by image processing methods, such as image sharpening by a high-pass filter, and image deblurring by a Laplacian filter and the Richardson-Lucy algorithm. However, these kinds of filters and deblurring methods increase the noise level. Thus, efficient techniques for generating high-resolution scan images in CT (and other 3D clinical imaging modalities) without increasing the noise level are needed.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are provided that facilitate enhancing the resolution of 3D anatomy scan images with minimal change in noise characteristics using a deep-learning enhancement network.

According to an embodiment, a system is provided that comprises a memory that stores computer executable components, and a processor that executes the computer executable components stored in the memory. The computer executable components comprise a reception component that receives a scan image generated from 3D anatomy scan data relative to a first axis of a 3D volume. The computer executable components further comprise an enhancement component that applies an enhancement model to the scan image to generate an enhanced scan image having a higher resolution relative to the scan image. For example, in various implementations, the input scan image can include CT scan image generated from CT scan data with standardized CT image processing techniques. With these implementations, the enhanced scan image comprises a sharpened/higher resolution version of the input scan image that has the same noise level and inter-tissue contrast level as the input scan image. The enhancement model comprises a deep learning neural network model trained on training image pairs respectively comprising a low-resolution scan image and a corresponding high resolution scan image generated relative to a second axis of the 3D volume, wherein the second axis and the first axis are different. For example, in some embodiments, the enhancement model can be trained on CT scan images generated along the z-axis and then applied to enhance CT scan images generated along a different axis (e.g., the axial axis).

These low/high resolution training image pairs can be generated using various techniques. For example, in some implementations, the low-resolution scan image comprises a thick slice scan image and the corresponding high-resolution scan image comprises a corresponding thin slice scan image generated using retro-reconstruction. In other implementations, the low-resolution scan image and the corresponding high-resolution scan image can be generated using focal spot wobbling. Still in other implementations, the low-resolution scan image and the corresponding high-resolution scan image can be generated via scanning the same structure using separate scanners, a low-resolution scanner and a high-resolution scanner, respectively.

In one or more embodiments, the system includes a training component that employs supervised machine learning to train the enhancement model to deconvolve tissue features, contrast features, spatial features and point spread function features between the training image pairs under one or more defined constraints. For example, the one or more defined constraints include at least one of, an intensity threshold constraint, a mask constraint, a spatial constraint, or contrast distribution constraint. The training component can employ one or more loss functions to preserve the one or more defined constraints. For example, the one or more loss functions can include, but are not limited to, a mean absolute error (MAE) loss function, a percentage loss function, a perceptual loss function, an adversarial loss function, and a point spread characteristics constraining loss function.

According to another embodiment, a system is provided that comprises a memory that stores computer executable components, and a processor that executes the computer executable components stored in the memory. The computer executable components comprise a training component that trains a deep learning network to enhance the quality of first scan images generated from first 3D anatomy scan data relative to a first axis of a 3D volume. The computer executable components further comprise an enhancement component that employs the deep learning network to enhance the quality of second scan images generated from the first 3D anatomy scan data or second 3D anatomy scan data relative to a second axis of the 3D volume. In various embodiments, the training of the deep learning network comprises training the deep learning network to learn one or more transformations between training image pairs respectively comprising a thick scan image and a corresponding thin scan image generated relative to the first axis of the 3D volume, and wherein the one or more transformation comprise a deblurring transformation between the training image pairs under a deblur constraint based one or more point spread function (PSF) characteristics associated with the second axis.

In some embodiments, elements described in the disclosed systems can be embodied in different forms such as a computer-implemented method, a computer program product, or another form.

DETAILED DESCRIPTION

Figure 1:
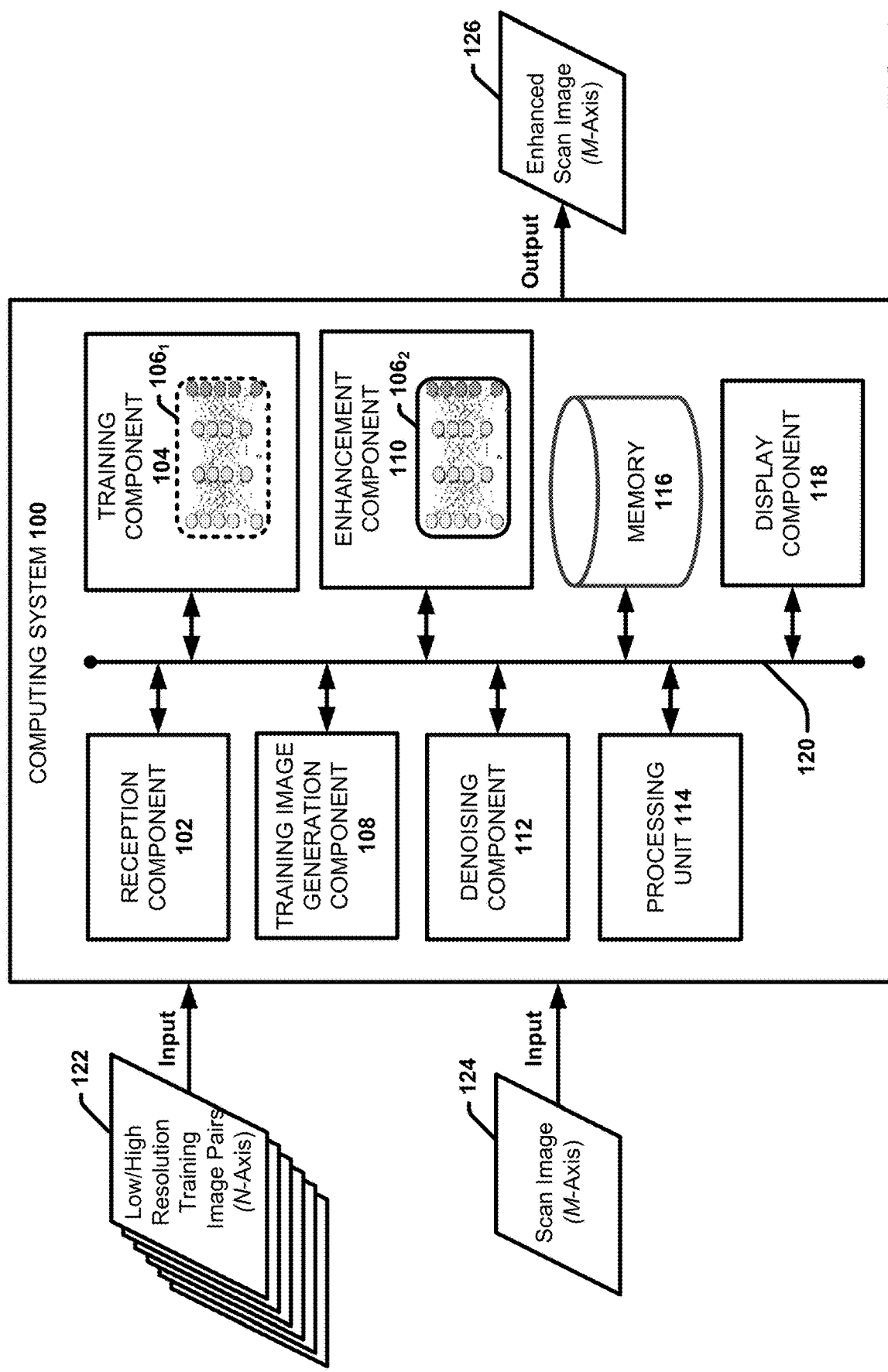
FIG. 1 illustrates a block diagram of an example, non-limiting system that facilitates enhancing the quality of 3D anatomy scan images using deep learning in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that facilitate enhancing the quality/resolution of 3D anatomy scan images with minimal changes in noise characteristics. In various embodiments, the 3D anatomy scan images include CT scan images, including multi-energy CT images and material images for dual energy CT and spectral CT. However, the disclosed techniques can be applied to other 3D medical imaging modalities, including but not limited to, MRI, positron emission tomography (PET), ultrasound, and the like. The disclosed techniques are further anatomy and acquisition protocol (e.g., contrast/non-contrast) agnostic.

The disclosed techniques employ a deep learning network model that receives a reconstructed scan image (e.g., a CT scan image) as input and generates an enhanced scan image as output. The enhanced scan image has increased sharpness/resolution or modulation transfer function (MTF) relative to the input image while further preserving the noise and inter-tissue contrast characteristics equivalent to that of the input image. The MTF is the spatial frequency response of an imaging system or a component. It is the contrast at a given spatial frequency relative to low frequencies. On the radiogram, objects having different sizes and opacity are displayed with different grey-scale values. MTF is responsible for converting contrast values of different-sized objects (object contrast) into contrast intensity levels in the image (image contrast). For general imaging, the relevant details are in a range between 0 and 2.0 cycles per millimeter (mm), which demands high MTF values. In summary, MTF is the capacity of the detector to transfer the modulation of the input signal at a given spatial frequency to its output. MTF is a useful measure of true or effective resolution, since it accounts for the amount of blur and contrast over a range of spatial frequencies.

The deep learning network model, referred to herein as the "enhancement model," comprises a supervised network that learns deblurring between training image pairs consisting of a low-resolution image and a corresponding high-resolution image. The low-resolution image can include or correspond to a thick image obtained/simulated from a larger detector while the high-resolution image can include or correspond to thin image obtained/simulated from a smaller detector. These training images can be realized either through retro-reconstruction from native thin and corresponding thick detector realization or focal-spot wobbling. The high-resolution image can be a denoised version as well (e.g., depending on the noise level of the input image, a denoising can precede the enhancement model).

In this regard, the enhancement model learns deblurring from training images generated only in the scan direction where a thin detector and a thick detector configuration equivalent image can be generated, either because of native resolution or through focal-spot wobbling. A CT detector (and other modality 3D medical imaging system detectors) will have similar point spread function (PSF) characteristics in all directions. This property is exploited to use the trained network in deblurring new scan images generated along other scan directions relative to the direction of the training images, as long as the deblur factor of the network training direction is less than PSF of the other scan directions. In other words, the disclosed techniques use the separable nature of the enhancement model transform and PSF similarity to apply the enhancement model transform in any directions of choice. In one example implementation, the enhancement model was trained on CT images generated along the z-direction and applied to transform new CT images generated along the axial direction. However, the proposed method enables generation of scan images with a sharper resolution/MTF than the imaging scanner system PSF can produce in both the axial z-direction (or in 3D), with or without changing the grid size. The enhancement model transform can be used to improve quality of scan images obtained from low-resolution scanners, and more importantly to generate ultra-high-resolution images from scan images obtained from the highest resolution scanner.

The proposed method also enables training the enhancement model to learn one or more non-linear transformations between input and output image pairs. For example, the non-linear transformations can be based on tissue specific transforms like denoising, artifact correction or Hounsfield unit (HU) dependent smoothing/sharpening. The enhancement model can also learn to deconvolve tissue/contrast/ spatial-dependent PSF features, with user-defined constraints. The user defined constraints can be in form of intensity thresholds, masks or spatial information or contrast distribution. This can also include PSF characteristics for each of these components (spatial/tissue/contrast).

The types of medical images processed/analyzed using the techniques described herein can include images captured using various types of image capture modalities. For example, the medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MR) images, ultrasound (US) images, color flow doppler (CD) images, position emission tomography (PET) images, single-photon emissions computed tomography (SPECT) images, nuclear medicine (NM) images, and the like. The medical images can also include synthetic versions of native medical images such as synthetic X-ray (SXR) images, modified or enhanced versions of native medical images, augmented versions of native medical images, and the like generated using one or more image processing techniques.

A "capture modality" as used herein refers to the specific technical mode in which an image or image data is captured using one or more machines or devices. In this regard, as applied to medical imaging, different capture modalities can include but are not limited to: a 2D capture modality, a 3D capture modality, an RT capture modality, a XR capture modality, a DX capture modality, a XA capture modality, a PX capture modality a CT, a MG capture modality, a MR capture modality, a US capture modality, a CD capture modality, a PET capture modality, a SPECT capture modality, a NM capture modality, and the like.

As used herein, a "3D image" refers to digital image data representing an object, space, scene, and the like in three dimensions, which may or may not be displayed on an interface. 3D images described herein can include data representing positions, geometric shapes, curved surfaces, and the like. In an aspect, a computing device, such as a graphic processing unit (GPU) can generate a 3D image based on the data, performable/viewable content in three dimensions. For example, a 3D image can include a collection of points represented by 3D coordinates, such as points in a 3D Euclidean space (e.g., a point cloud). The collection of points can be associated with each other (e.g., connected) by geometric entities. For example, a mesh comprising a series of triangles, lines, curved surfaces (e.g. non-uniform rational basis splines ("NURBS")), quads, n-grams, or other geometric shapes can connect the collection of points. In an aspect, portions of the mesh can include image data describing texture, color, intensity, and the like.

A 3D anatomy image refers to a 3D or volumetric representation of an anatomical region of a patient. In some implementations, a 3D anatomy image can be captured in 3D directly by the acquisition device and protocol. In other implementations, a 3D anatomy image can comprise a generated image that was generated from one-dimensional (1D) two-dimensional (2D) and/or 3D sensory and/or image data captured of the anatomical region of the patient. Some example 3D medical images include 3D volume images generated from CT scan data, and MRI scan data. It is noted that the terms "3D image," "3D volume image," "volume image," "3D model," "3D object,", "3D reconstruction," "3D representation," "3D rendering," and the like are employed interchangeably throughout, unless context warrants particular distinctions among the terms. It should be appreciated that such terms can refer to data representing an object, an anatomical region of the body, a space, a scene, and the like in three dimensions, which may or may not be displayed on an interface. The terms "3D data," and "3D image data" can refer to a 3D image itself, data utilized to generate a 3D image, data describing a 3D image, data describing perspectives or points of view of a 3D image, capture data (e.g., sensory data, images, etc.), meta-data associated with a 3D image, and the like. It is noted that the term "2D image" as used herein can refer to data representing an object, an anatomical region of the body, a space, a scene, and the like in two dimensions, which may or may not be displayed on an interface.

The term "3D anatomy scan data" is used herein to refer to the collection of scan data acquired/generated in association with a performance of a 3D medical imaging scan, such as a CT scan, an MRI scan, a PET scan or the like. For example, 3D anatomy scan data can include 1D, 2D and 3D data that can be used to generate a 3D volumetric image of the scanned anatomy and to generate 2D scan images corresponding to slices of the 3D volumetric image from various perspective/orientations (e.g., relative to the axial plane, the coronal plane, the sagittal plane and other reformatted views). The term "scan slice," "image slice," "scan image," and the like are used herein interchangeably to refer to a reconstructed 2D image generated from 3D anatomy scan data that corresponds to a computer-generated cross-sectional image of an anatomical region of a patient.

The terms "thick" and "thin" as applied to a scan image/ slice are used herein to refer to the relative thickness of the tissue represented in the slice, which can vary depending on the scanner detector. It should be appreciated that a thin slice has a smaller thickness than a thick slice. In accordance with most 3D medical imaging modalities (e.g., CT, MRI, PET, etc.), the native resolution of thin scan images (e.g., obtained with thin detectors) is higher than the native resolution of thicker scan images (e.g., obtained with thicker detectors). In this regard, a thick scan image paired with corresponding thin scan image is assumed to have a lower resolution relative to the thin scan image. For example, the nominal slice thickness in CT is defined as the full width at half maximum (FWHM) of the sensitivity profile, in the center of the scan field; its value can be selected by the operator according to the clinical requirement and generally lies in the range between 1 millimeter (mm) and 10 mm. In general, the larger the slice thickness, the greater the low contrast resolution in the image, while the smaller the slice thickness, the greater the spatial resolution. If the slice thickness is large, the images can be affected by artifacts due to partial volume effects, while if the slice thickness is small, the images may be significantly affected by noise. The terms scan image/slice are used herein to refer to the relative thickness of the tissue represented in the slice, which can vary depending on the scanner detector. The terms "low-resolution" and "high-resolution" as used herein refer to the relative resolution or MTF of two images, wherein low-resolution image is interpreted as having a lower resolution relative to the high-resolution image.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting computing system 100 that facilitates enhancing the quality of 3D anatomy scan images using deep learning in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

In this regard, computing system 100 can be and/or include various computer executable components. In the embodiment shown, these computer executable components include a reception component 102, a training component 104, a training image generation component 108, an enhancement component 110, a denoising component 112 and a display component 118. These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 116 of the computing system 100 which can be coupled to processing unit 114 for execution thereof. Examples of said and memory and processor as well as other suitable computer or computing-based elements, can be found with reference to FIG. 13, and can be used in connection with implementing one or more of the systems or components shown and described in connection with FIG. 1 or other figures disclosed herein.

Computing system 100 also includes an enhancement model 106 that can be or include a computer executable component. The enhancement model 106 corresponds to a supervised machine learning model adapted to generate enhanced versions of input scan images by deblurring and increasing the MTF of the input scan images while maintaining their noise characteristics and inter-tissue contrast characteristics. The training component 104 provides for training and developing the enhancement model 106 and the enhancement component 110 applies the trained model to new scan images (e.g., scan image 124) to generate enhanced scan images in the field (e.g., enhanced scan image 126). In the embodiment shown, subscript 1 is used to indicate the enhancement model $106_1$ is in the training/development stage and subscript 2 is used to indicate the enhancement model $106_2$ has completed training and executable by the enhancement component 110. The type of supervised machine learning model used for the enhancement model 106 can vary. In one or more exemplary embodiments, the enhancement model 106 can be or include a deep learning network model, such as a convolutional neural network (CNN). However, other types of machine learning models are envisioned.

The reception component 102 can receive the image data used for model training and/or model application/inferencing. In the embodiment shown, the training data includes low/high resolution training image pairs 122 and the image data used for model application is represented by scan image 124. It should be appreciated that although one scan image 124 is shown, the number of input scan image processed by the trained enhancement model enhancement model $106_2$ can include any number (e.g., all scan images in a series processed sequentially or in parallel by multiple instances of the trained model). The type of the scan images used for training and inferencing should be the same modality but can vary with respect to numerous other factors (e.g., orientation, region of interest ROI, acquisition protocol, etc.). In various exemplary embodiments, the scan images (e.g., the low/high resolution training image pairs 122 and the scan image 124) are CT scan images. However, the disclosed techniques can also be applied to MRI images, PET images, and other 3D medical imaging modality reconstructed images.

The low/high resolution training image pairs 122 include a plurality of exemplary scan image pairs, wherein each pair includes a low-resolution image and a corresponding high-resolution image. In this regard, the low-resolution image and the high-resolution image are considered corresponding or paired because they respectively depict the same structure (e.g., an anatomical ROI, a phantom image, etc.) in the same orientation yet with different resolutions or MTFs. In other words, the high-resolution image of each training image pair represents a higher resolution version of its corresponding low-resolution image. As described in greater detail below, the disclosed techniques employ supervised machine learning techniques to train the enhancement model $106_1$ to learn how to transform the low-resolution training images into their corresponding/paired high-resolution images.

The low/high resolution training image pairs 122 can be generated/realized using various techniques in a direction where a thin detector and a thick detector configuration equivalent image can be generated. In this regard, for most CT scanners (and other 3D medical imaging systems), an image acquired with a thin detector and a corresponding one with thick detector equivalent is not realizable in all directions. However, a CT scanner detector will have similar PSF characteristic in all directions. This property is exploited to train the enhancement model $106_1$ on image pairs generated in the direction where thin and corresponding thick scan images are realizable. The trained enhancement model $106_2$ can then be used to deblur new scan images captured/generated along other directions with similar pixel spacing, as long as the deblur factor of the model is less than PSF of the new direction. The trained enhancement model $106_2$ can also be used to enhance scan images captured/generated relative to the training direction.

In this regard, the low/high resolution training image pairs 122 can generated/realized using various techniques. In some implementations, the low-resolution images can include thick scan slice images and the high-resolution images can include corresponding thin slice scan images. For example, the thin scan image of can correspond to a slice within the thickness of is paired thick scan image. In this regard, the thick and thin scan images can respectively depict the same anatomical region of the patient in the same orientation. With these embodiments, the thick scan images can be generated through retro-reconstruction from their corresponding native thin scan images. In other embodiments, the corresponding low- and high-resolution training image pairs can be generated using focal-spot wobbling. Still in other embodiments, the low-resolution images of the training image pairs can be generated using a low-resolution scanner while the high-resolution images can be generated using a different, high-resolution scanner. For example, the same subject, structure, phantom image, or the like can be scanned with a low-resolution scanner in one direction to generate the low-resolution images and further scanned in the same direction using a high-resolution scanner in the same direction to generate corresponding high-resolution images at the same positions. In any of the above described techniques for generating the low-resolution and corresponding high-resolution scan images, in some implementations, the high-resolution scan image can be generated with a comb filter and the corresponding low-resolution scan image can be generated without a comb filter.

The number of training image pairs can vary. The training image pairs may be generated from the same 3D anatomy scan and/or different 3D anatomy scans (e.g., for same and different patients). These images can be generated from 3D anatomy scan data in only a direction where a thin detector and a thick detector configuration equivalent image can be generated. The disclosed techniques are anatomy and acquisition protocol agnostic. In this regard, the 3D anatomy scan or scans used to generate the training image pairs can represent the same or different anatomical regions of interest (ROI) and be captured with same or different acquisition protocols. In some embodiments, all of the training image pairs can be generated from 3D anatomy scans captured from the same scanner (or different instances of the same scanner). In other embodiments, the training image pairs can be generated from 3D anatomy scans captured from different scanners (e.g., different types of scanners, different models, etc.) using scanner detectors with same or similar PSF characteristics.

In the embodiment shown, the low/high resolution training image pairs 122 are generated relative to the N-axis and the new scan image 124 to which the trained enhancement model 106 is applied at the inferencing stage after training (e.g., by the enhancement component 110) is generated relative to the M-axis. The parameters N and M are merely arbitrary and used to denote two different axes of a 3D coordinate volume/system. In various embodiments, the 3D coordinate volume/system can be or correspond to a Cartesian coordinate system that employs three coordinate axes, each perpendicular or orthogonal to the other two at the origin. In mathematics, these axes are usually labeled as x, y and z. In medical imaging, these reference axes are often labeled as axial (or transverse), coronal and sagittal. For example, there are three standard anatomic planes that are generally used to display data for CT scans: axial (or horizontal), coronal (cutting the body into slices that go from anterior to posterior or posterior to anterior), and sagittal (cutting the body into slices that go from right to left or left to right). However, 2D CT scan images can also be generated relative to other planes (e.g., oblique or even curved planes). As described herein, reference to scan images being generated relative to one axis of a 3D coordinate system refers to the scan images being generated at different points along the direction of the one axis such that each scan image is oriented relative to the same anatomical plane. In various example implementations described herein, the N-axis corresponds to the z-axis (or sagittal and/or coronal axis) and the M-axis corresponds to the x-axis (or axial axis). However, it should be appreciated that the M-axis can include any axis relative to 3D anatomy scan data in which an image acquired with a thin detector and corresponding one with thick detector equivalent is realizable, and the N-axis can include any other orientation, including an axis that is non-orthogonal to the M-axis.

In the embodiment shown, the reception component 102 can receive that low/high resolution training image pairs 122 for usage by the training component 104 to train and develop the enhancement model $106_1$. Additionally, or alternatively, the training image generation component 108 can generate the low/high resolution training image pairs 122 from received (or otherwise accessible) 3D anatomy scan data. With these embodiments, the training image generation component 108 can generate the low/high resolution training image pairs either through retro-reconstruction from native thin and corresponding thick detector realization or focal-spot wobbling. In some embodiments, the high-resolution image of each (or in some implementations one or more) training image pair can be a denoised image. For example, the high-resolution scan image can be received by the reception component 102 in a denoised form. Additionally, or alternatively, the denoising component 112 can perform one or more existing medical image denoising process to transform the high-resolution scan images into denoised versions. The denoising component 112 may also denoise new scan images (e.g., scan image 124) prior to application of the trained enhancement model $106_2$ thereto to generate the enhanced scan images (e.g., enhanced scan image 126). Some example denoising processes that can be used to denoise the denoising component 112 to denoise the input scan images can include but are not limited to: wavelet methods, curvelet methods, ridgelet based methods, sparse representation methods, shape adaptive transform methods, bilateral filtering, principal component analysis (PCA), and nonlocal means (NL-means), and nonlinear variational methods.

In various embodiments, the training component 104 trains the enhancement model $106_1$ using supervised machine learning to learn and perform one or more transformations between the low- and -high resolution paired images of the low/high resolution training image pairs 122, wherein the high-resolution paired images are used as the ground truth example. In this regard, the training process involves training the enhancement model $106_1$ to transform the low-resolution image into its corresponding high-resolution image while maintaining the noise characteristics and tissue contrast characteristics of both images.

As noted above, in some embodiments, the low-resolution training images can comprise thick scan slice images while the high-resolution scan images can include corresponding thin slice scan images. The thickness of the respective images in each pair can vary so long as long as the thin image is thinner than its paired thick image. In one example embodiment in which the training images comprise CT images, the thin scan image of each training image pair can have a thickness of 0.625 mm while the thick scan image can have a thickness of 1.25 mm. However, it should be appreciated that these thicknesses are merely exemplary. Owing to their thickness variations, the point spread functions (PSF) used to generate the thick and thin images in the respective pairs are different. That is, the PSF of the thick (low-resolution) image is wider than the PSF of the corresponding thin (high-resolution) image.

In various embodiments, the enhancement model $106_1$ can employ a deep learning neural network that can be trained (e.g., by the training component 104) using supervised machine learning to learn and perform a deblurring transformation between the low-resolution images and their corresponding high-resolution images based on their respective PSF characteristics. More particularly, the enhancement model $106_1$ can be trained to deblur the low-resolution image to achieve the PSF of its corresponding high-resolution mage. For example, the training component 104 can train the enhancement model $106_1$ to deblur the low-resolution mage a deblur amount controlled by the PSF of its corresponding high-resolution image. However, in order to be able to apply the trained enhancement model $106_2$ to new scan images generated relative to a different axis (e.g., scan image 124), the deblur amount should be less than the PSF associated with the different axis. In other words, the deblurring amount of PSF and/or slice sensitivity profile (SSP) removed from the low-resolution image by the convolution performed by the enhancement model 106₁ can be constrained to be less than the minimum PSF and/or SSP that can be achieved in the applied/inferencing direction (which is a function of the imaging system used to acquire and generate the input scan images in the applied/inferencing direction). For example, assume the enhancement model 106₁ was trained to remove 5 units of PSF from the low-resolution scan images to achieve the PSF of their corresponding high-resolution scan images. In this example, the PSF of the new direction scan image (e.g., scan image 124) must be greater than 5. This is a minimal condition that needs to be maintained.

In this regard, the training component 104 can employ supervised machine learning to train the enhancement model 106₁ to learn and perform one or more non-linear transformations between the training image pairs. The one or more non-linear transformations can include transformations based on (but not limited to) tissue specific denoising, artifact correction, and HU-dependent smoothing/sharpening. For example, the training component 104 can train the deep learning model to deconvolve tissue features, contrast features, spatial features and/or PSF features of these components (e.g., tissue/contrast/spatial) between the training image pairs under one or more user defined constraints. The one or more user defined constraints can include at least one of, an intensity threshold constraint, a mask constraint, a spatial constraint, or contrast distribution constraint. The training component 104 can employ various loss functions to preserve the one or more user defined constraints. Some suitable loss functions can include but are not limited to: a mean MAE loss function, a percentage loss function, a perceptual loss function, an adversarial loss function, and a point spread characteristics constraining loss function.

Figure 2:
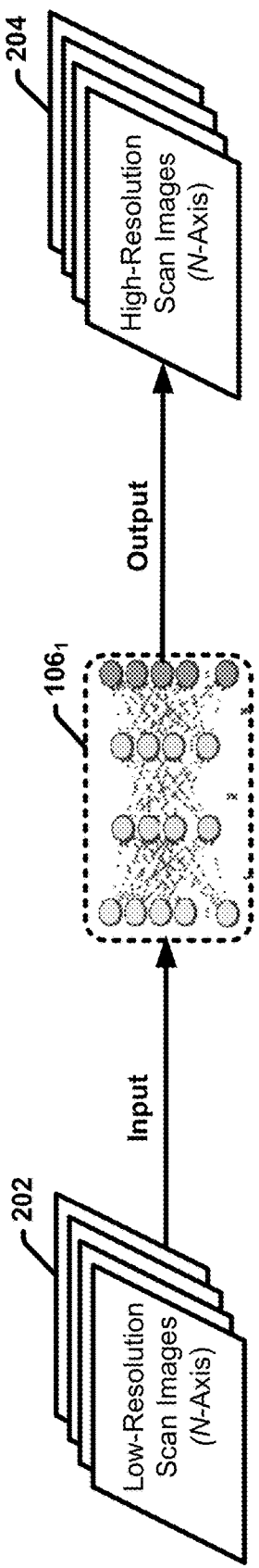
FIG. 2 presents an example framework for training a deep learning network to enhance the quality of 3D anatomy scan images in accordance with one or more embodiments of the disclosed subject matter.
Figure 2:
Figure 2:

FIG. 2 presents an example framework for training a deep learning network (i.e., enhancement model 106₁) to enhance the quality of 3D anatomy scan images in accordance with one or more embodiments of the disclosed subject matter. As shown in FIG. 2, the supervised training process involves training the enhancement model 106₁ to learn how to transform low-resolution scan images 202 generated relative to one axis (e.g., the N-axis) into their corresponding high-resolution scan images 204 generated relative to the same axis. The training/learning process involves training the network to learn non-linear convolution transformations between the training image pairs. Once the network is trained and tuned, the network can be used to transform a scan image into a reconstructed higher resolution (or higher MTF) image that resembles its corresponding thin scan image. The new scan image can have a same or similar resolution as the low-resolution training images and/or a higher or lower resolution than the low-resolution training images. The new scan image can also have a different orientation relative to the training images (e.g., generated along a different axis or plane). The training method is separable along each dimension in 3D, so it can be either done in 1D separately or 2D or 3D. If the PSF in the direction of learning is same as all directions of inferencing, then the filter dimensions can be reduced only to the required dimension (e.g., 1D) leading to a much lighter network. For example, if the PSF in the direction of learning is same as all directions of inferencing, then the enhancement model 106₁ can learn the PSF convolution between the training image pairs along the row pixels in 1D (e.g., the x-direction) and apply it the column pixels in 2D (e.g., the y-direction) and additional pixels in 3D (e.g., the z-direction).

In one example implementation, the low-resolution scan images 202 can include low-resolution CT scan images in the sagittal and/or coronal orientation (i.e., generated relative to the z-axis). Their corresponding high-resolution scan images 204 can include high-resolution CT scan images in the same sagittal and/or coronal orientations (i.e., generated relative to the z-axis). The low/high resolution training images can be generated using one or more of the techniques described herein (e.g., thick/thin retro-reconstructions, focal spot wobbling, usage of separate high- and low-resolution scanners, and the like).

In embodiments in which the training image pairs include thick/thin scan slice images, the slice thickness (ST) of the thick images and the thin images as well as the slice pacing (SS) can vary. In some embodiments, the ST of the thin images can be about half the slice thickness of the thick images. The SS between the thick images and/or the thin images can be a function of the display field of view (DFOV) of the desired enhanced output image when the network is applied by the enhancement component to scan images with alternate orientations relative to the orientation of the training images. The DFOV determines how much of the scan field of view is reconstructed into an image. The pixel size of a reconstructed image can be calculated by dividing the DFOV by the matrix size. The matrix (also referred to as the grid), is the 2D grid of pixels used to compose images on a display monitor. The matrix determines the number of rows and columns.

In this example, the slice thickness (ST) of the thick scan images 202 is 1.25 mm while the ST of the thin scan images is 0.625 mm. The slice spacing (SS) between the thin scan images 202 and their corresponding thin scan images 204 can be kept the same to maintain the same image dimensions and grid size. For example, in one implementation, the SS between the thick images and the thin images can both be 0.625.

Additionally, or alternatively, the high-resolution scan images 204 in the training image pairs can include up-sampled images with double (or increased by another factor) the grid size of their corresponding low-resolution scan images 202. This can be accomplished for example, by decreasing the SS of the high-resolution, thin scan images by half (e.g., 0.5×) to perform an up-sampling of the input image during deconvolution to further increase the grid size and the corresponding resolution/sharpness of the output image, resulting in a super-high-resolution output image. With these embodiments, the enhancement model 106₁ can include a downstream up-sampling filter that increases the grid size of the input scan image in association with generating the output scan image, resulting in a super-high-resolution output image.

Figure 3:
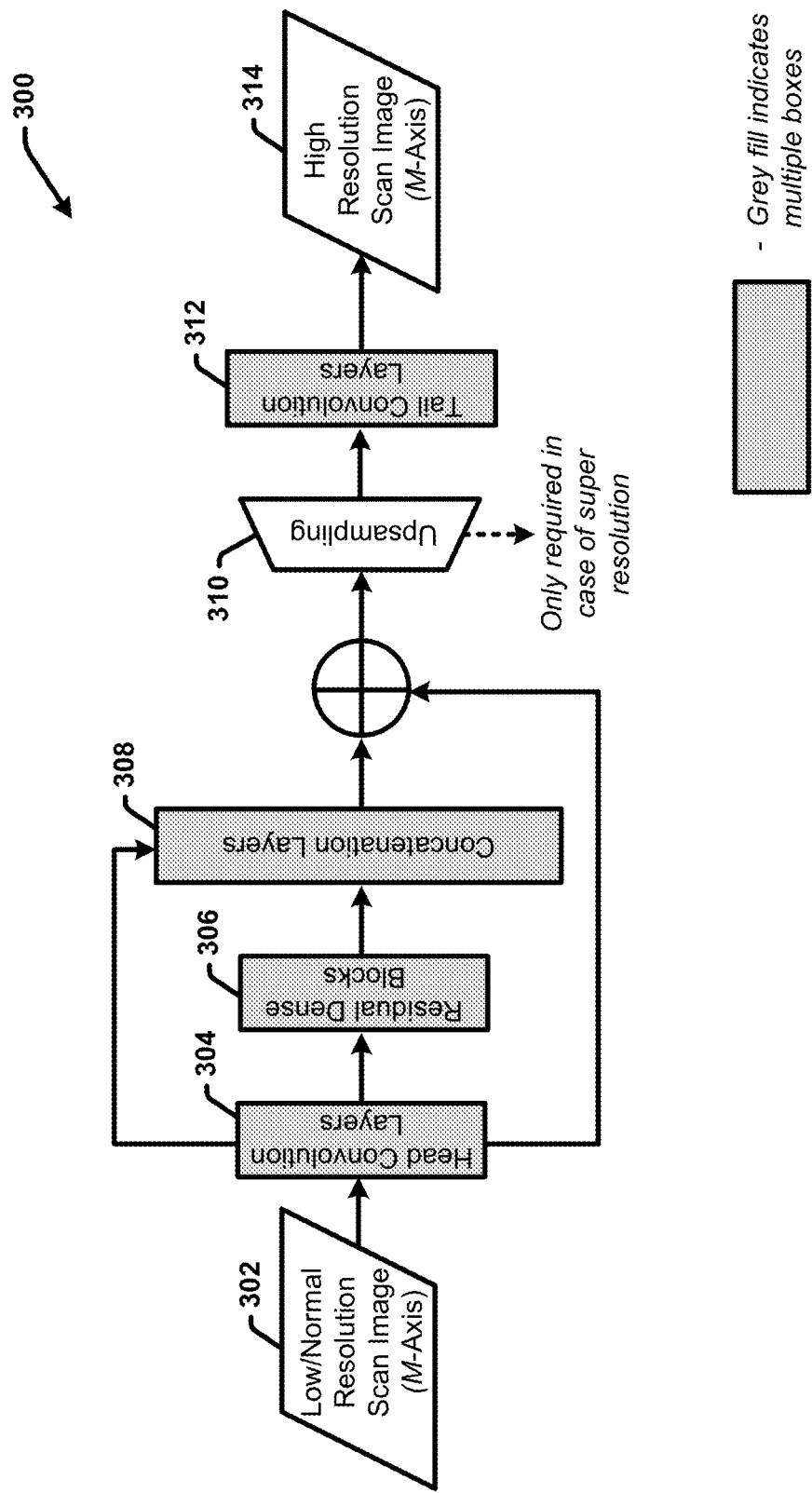
FIG. 3 presents an example enhancement model architecture in accordance with one or more embodiments of the disclosed subject matter.

FIG. 3 presents an example enhancement model architecture 300 in accordance with one or more embodiments of the disclosed subject matter. The architecture employed in this example resembles a CNN with up-sampling. In accordance with this example, the enhancement model receives a low/normal resolution scan image 302 with an M-axis orientation (e.g., axial) and outputs a high-resolution scan image 314 in the M-axis orientation, wherein the model was trained on scan images with an N-axis orientation (e.g., sagittal and/or coronal). The architecture 300 includes head convolution layers 304, residual dense blocks 306, concatenation layers 308, an up-sampling layer, and tail convolution layers 312. The grey filled boxes indicate multiple (e.g., two or more) boxes or layers which can respectively include multiple (e.g., two or more) filters. The up-sampling layer 310 can be adapted to increase the grid size of the input image by a desired factor (e.g., 2× or another factor), to generate super high resolution output image. The up-sampling layer 310 can be removed to maintain the same grid size or included to provide for super resolution output.

With reference again to FIG. 1, once the enhancement model $106_2$ has been trained on scan images in the N-axis orientation, the enhancement component 110 can apply the model to new scan images in a different orientation (e.g., scan image 124 with an M-axis orientation) to output corresponding enhanced scan images in the same orientation (e.g., enhanced scan image 126 with an M-axis orientation). The output images can be displayed on a monitor/display screen by the display component 118 for review by a clinician (e.g., a radiologist), stored, or exported for further processing (e.g., using one or more image processing models). The output images (e.g., enhanced scan image 126) have a higher resolution/MTF relative to the input images (e.g., scan image 124) with a same or similar noise level and inter-tissue contrast appearance. In various embodiments, the enhancement model $106_2$ increases the resolution/MTF of the output image between about 30% and 80% relative to the input image with less than a 10% change in noise characteristics and inter-tissue contrast appearance. In embodiments in which up-sampling is not performed by the enhancement model $106_2$, the enhanced scan image 126 and the input scan image 124 will have the same size (e.g., same grid size). In embodiments in which up-sampling is performed by the enhancement model $106_2$, the enhanced scan image 126 will have a larger size (e.g., larger grid size) relative to the input scan image 124.

The architecture of system 100 can vary. For example, one or more components of the computing system 100 can be deployed on the same computing device (e.g., the scanner device/system used to acquire/capture and generate the input scan images). Additionally, or alternatively, one or more components of the computing system 100 can be deployed at different communicatively coupled computing devices (e.g., via one or more wired or wireless communication networks) in a distributed computing architecture.

Figure 4:
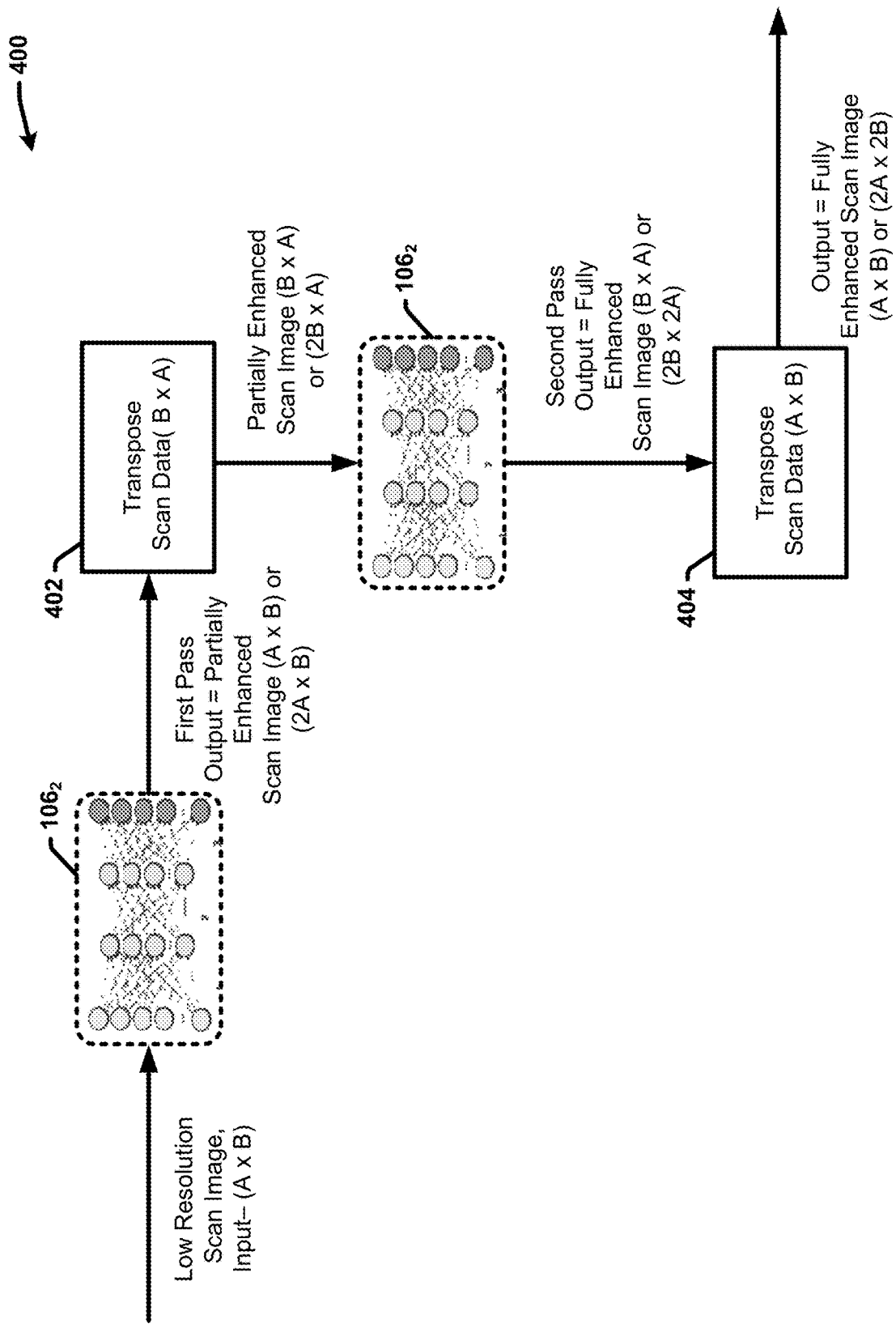
FIG. 4 presents a flow diagram of an example process for employing a deep learning-based enhancement model to enhance the quality of 3D anatomy scan image in accordance with one or more embodiments of the disclosed subject matter.

FIG. 4 presents a flow diagram of an example process 400 for employing the enhancement model $106_2$ to enhance the quality of 3D anatomy scan images in accordance with one or more embodiments of the disclosed subject matter. In accordance with process 400, the enhancement model $106_2$ was trained to learn the transform between low/high resolution training image pairs generated along a first direction/axis in 3D while the input scan image were generated relative to a second direction/axis in 3D. In some embodiments in which the enhancement model $106_2$ reformat improves resolution only in one direction (e.g., 1D), the enhancement component 110 can apply the enhancement model $106_2$ two times while transposing the input scan image to enhance the input image in 2D (e.g., wherein all scan images are 2D images).

In this regard, in accordance with process 400, the enhancement component 110 can first apply the enhancement model $106_2$ to a low-resolution input scan image having a first orientation that is different from the training direction. In this example, the first orientation is arbitrarily denoted as (A×B), which can correspond to any two orthogonal axes of a 3D coordinate system (e.g., X×Y, axial, etc.). The output of the first pass includes a partially enhanced scan image in the same orientation as it was input. In this regard, for the first pass, the enhancement model $106_2$ enhances the characteristics of the input image along one dimension or axis, which in this case is the A-direction. In embodiments in which the model is adapted to perform up-sampling, the output scan image will also be up-sampled in the applied direction. For example, the up-sampling can increase the grid size in the applied direction by double (or 2×), resulting in the output image being (2A×B). In this regard, the enhance scan image can have a same or larger size (grid size) relative to the input image.

At 402, the enhancement component 110 then transposes the scan data to change is input orientation to (B×A). This process can correspond to flipping the orientation of a 2D image from portrait to landscape (or vice versa). The partially enhanced scan image which has been enhanced along the A direction only is then input to the enhancement model $106_2$ a second time to enhance the characteristics along the orthogonal direction/dimension, the B-direction. The output of the second pass includes a fully enhanced scan image in the (B×A) orientation. Again, if the model is adapted to perform up-sampling, the output scan image will also be up-sampled in the applied direction, resulting in the output image being (2A×2B).

The image is considered fully enhanced because it has now been enhanced in both dimensions of the 2D image, A and B. At 404, the enhancement component 110 can transpose the scan data again to return its orientation to the same orientation of the original input image, that is the (A×B) orientation. The final result of process 400 is a fully enhanced scan image in the (A×B) orientation which may be up-sampled to provide a super resolution image (e.g., 2A×2B).

Figure 5:
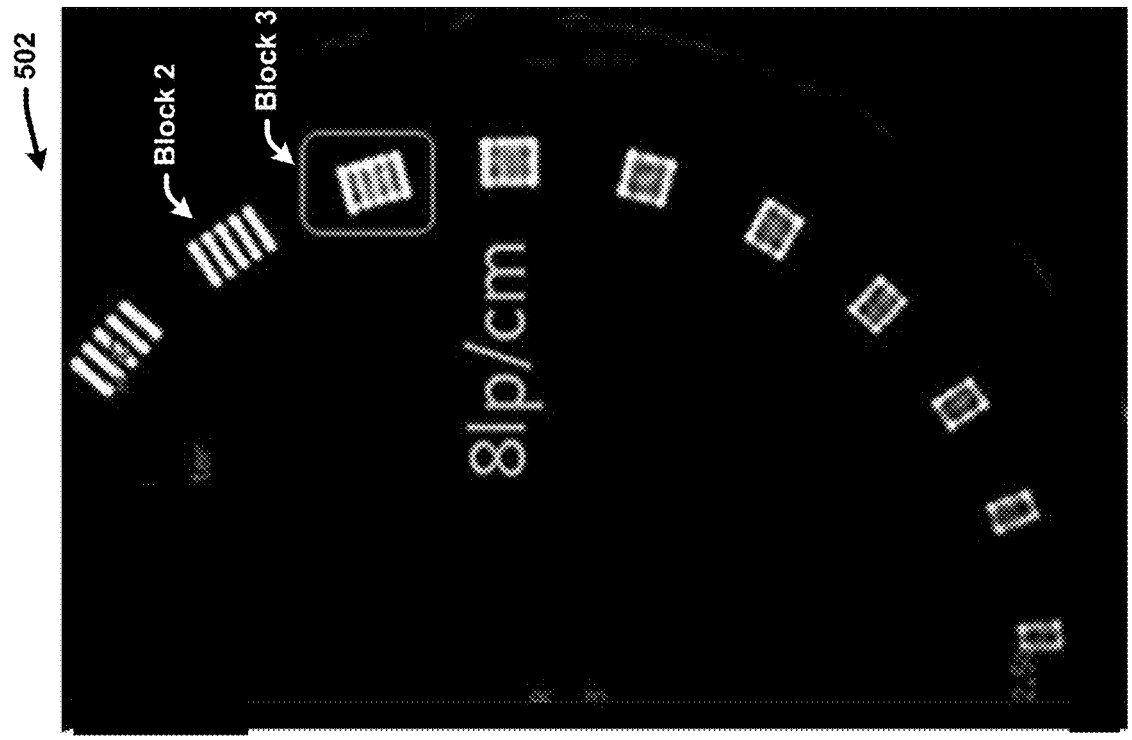
FIG. 5 present phantom CT images with and without deep learning-based enhancement in accordance with one or more embodiments of the disclosed subject matter.
Figure 5:
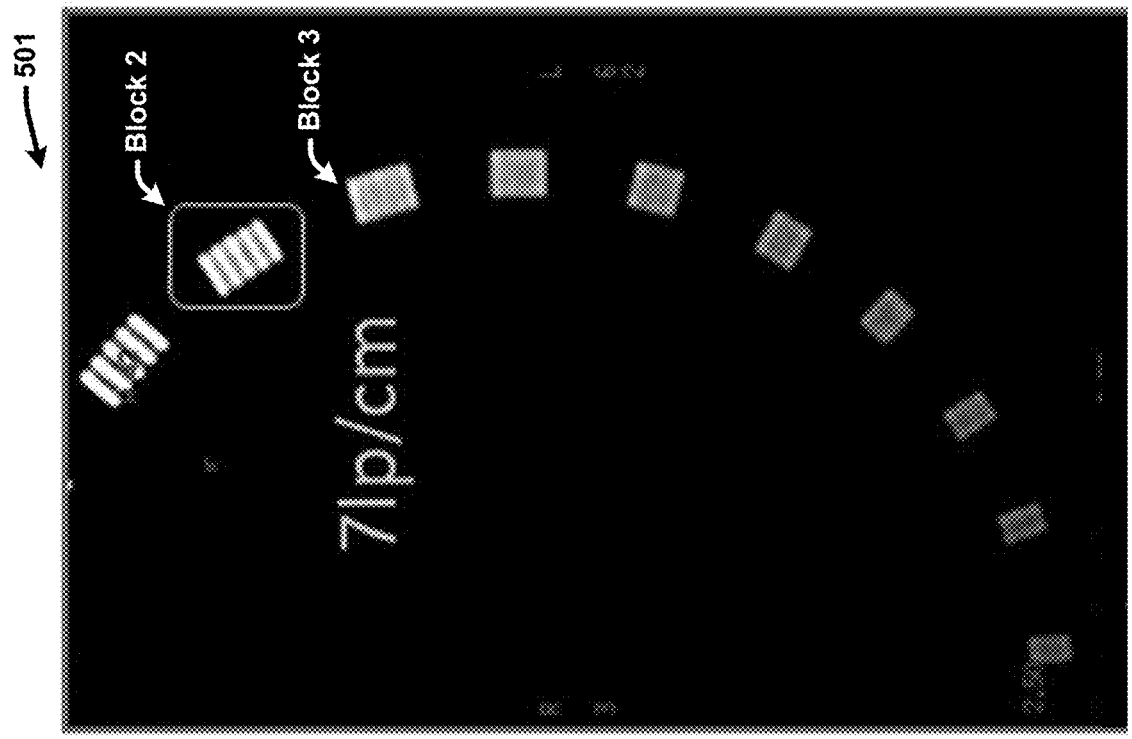

FIG. 5 presents a phantom CT image with and without deep learning-based enhancement in accordance with one or more embodiments of the disclosed subject matter. Image 501 depicts the input phantom CT image without enhancement model $106_2$ application and image 502 depicts the output phantom CT image with enhancement model $106_2$ application. The MTF of the respective images is measured in line pairs per centimeter (lp/cm). As can be seen by comparison of the input image 501 and the output image 502, the MTF of the output image 502 is higher than the input image 501. The enhanced resolution of the output image 502 relative to the input image 501 can also be clearly discerned. For example, the second block of lines in the output image 502 are clearly sharper and more distinguishable than the second block of lines in the input image 501. Furthermore, the third block of lines in the input image 501 are blurred and cannot be distinguished while the third block of lines in the output image 502 are clearly sharper and more distinguishable.

Figure 6:
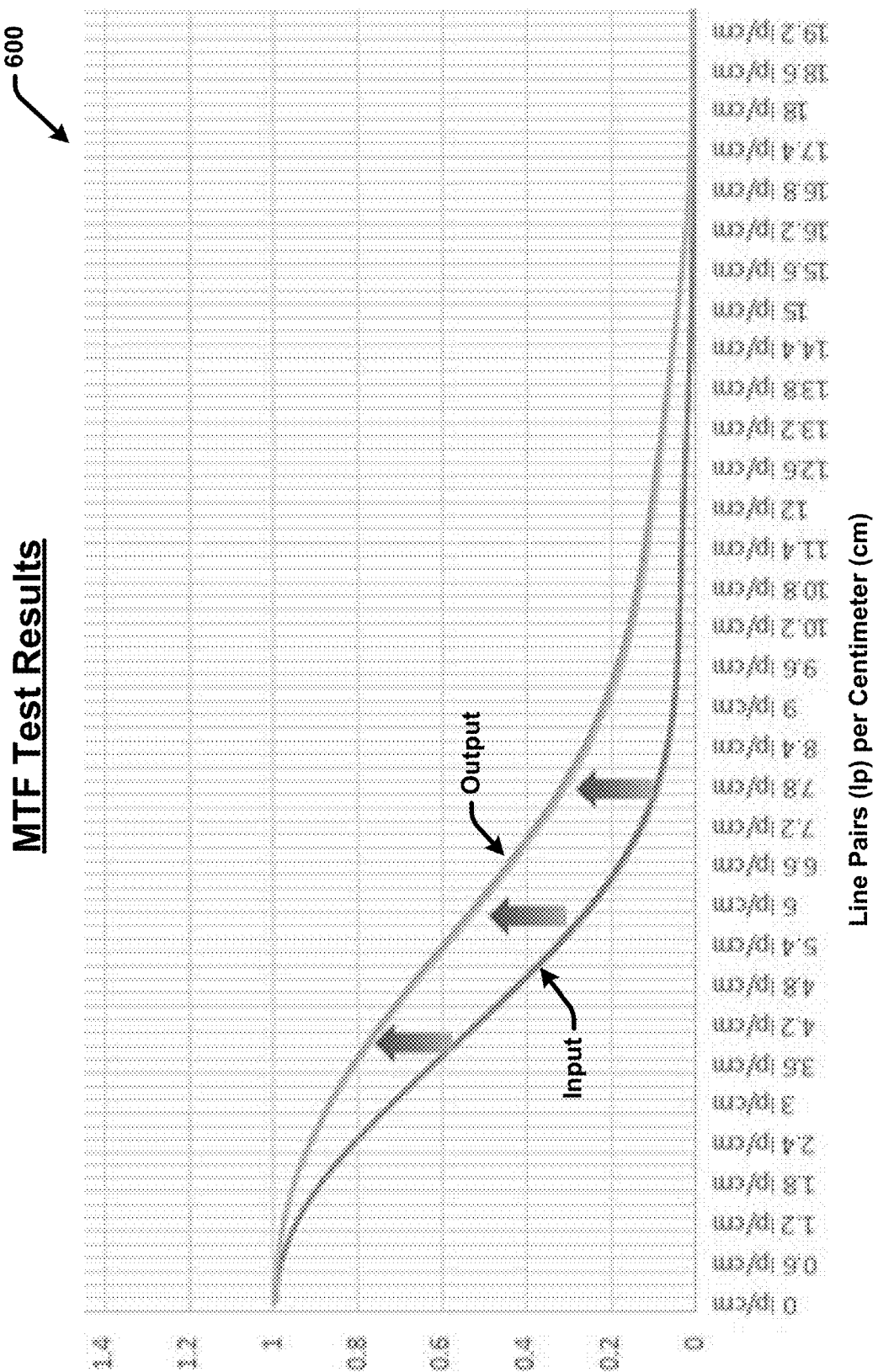
FIG. 6 provides a graph comparing MTF test results on phantom CT images with and without deep learning-based enhancement in accordance with one or more embodiments of the disclosed subject matter.

FIG. 6 provides a graph 600 comparing MTF test results on phantom CT images with and without deep learning-based enhancement in accordance with one or more embodiments of the disclosed subject matter. The horizontal axis (e.g., the x-axis) plots the line pairs that can be resolved per cm (lp/cm). The input curve line corresponds to scan images at different slices thickness without enhancement while the output curve line corresponds to the same scan images after application of the enhancement model. As can be seen in graph 600, the MTF lp/cm values for the output scan images with enhancement at different slice thicknesses are clearly improved relative to the input scan images without enhancement. For example, the enhanced scan images achieve the same or similar MTF as the unenhanced scan images yet at a greater thickness, especially in the range between 1.2 lp/cm and 13.2 lp/cm. More importantly, the curves for the enhanced images relative to the unenhanced images have substantially the same shape, which demonstrates that aside from the sharper resolution, the other characteristics of the respective enhanced and unenhanced images (e.g., noise characteristics, inter-tissue contrast characteristics) remain substantially the same (e.g., the enhanced images are not distorted relative to the unenhanced images).

Figure 7:
FIGS. 7-9 presents clinical MTF CT images before and after application of the disclosed enhancement model in accordance with one or more embodiments of the disclosed subject matter.
Figure 7:
Figure 8:
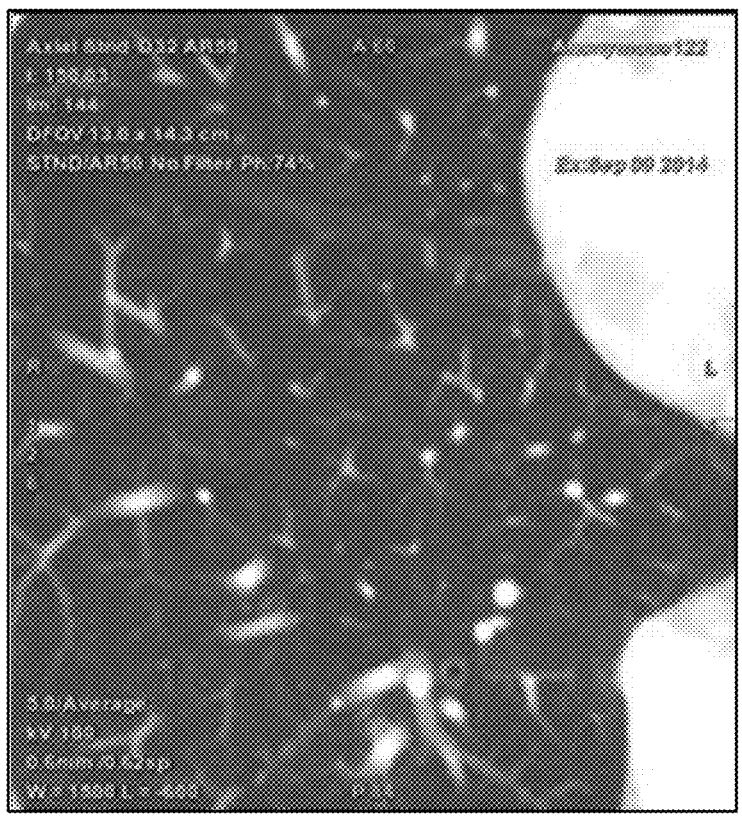
Figure 8:
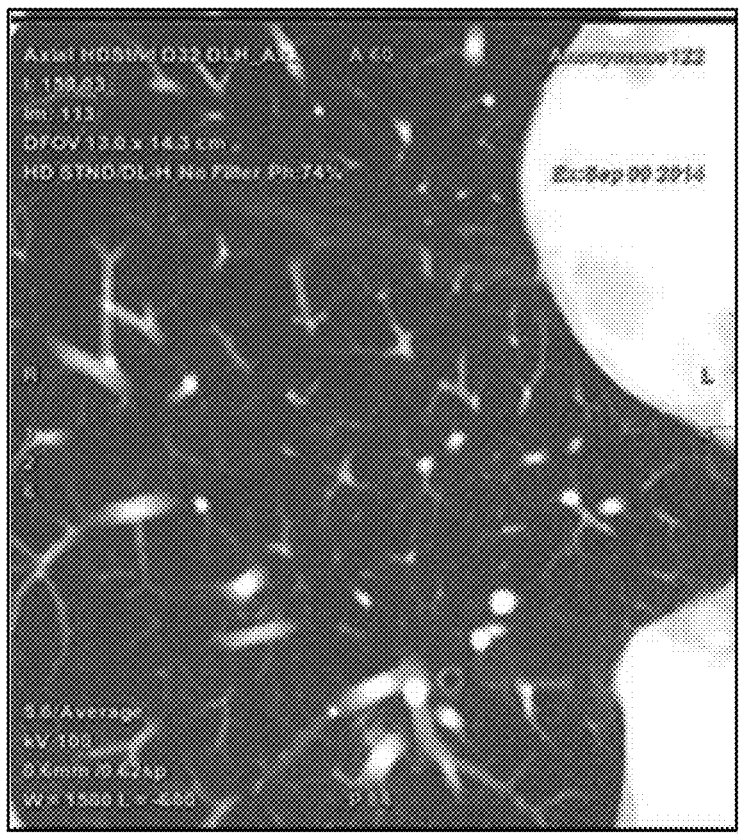
Figure 9:
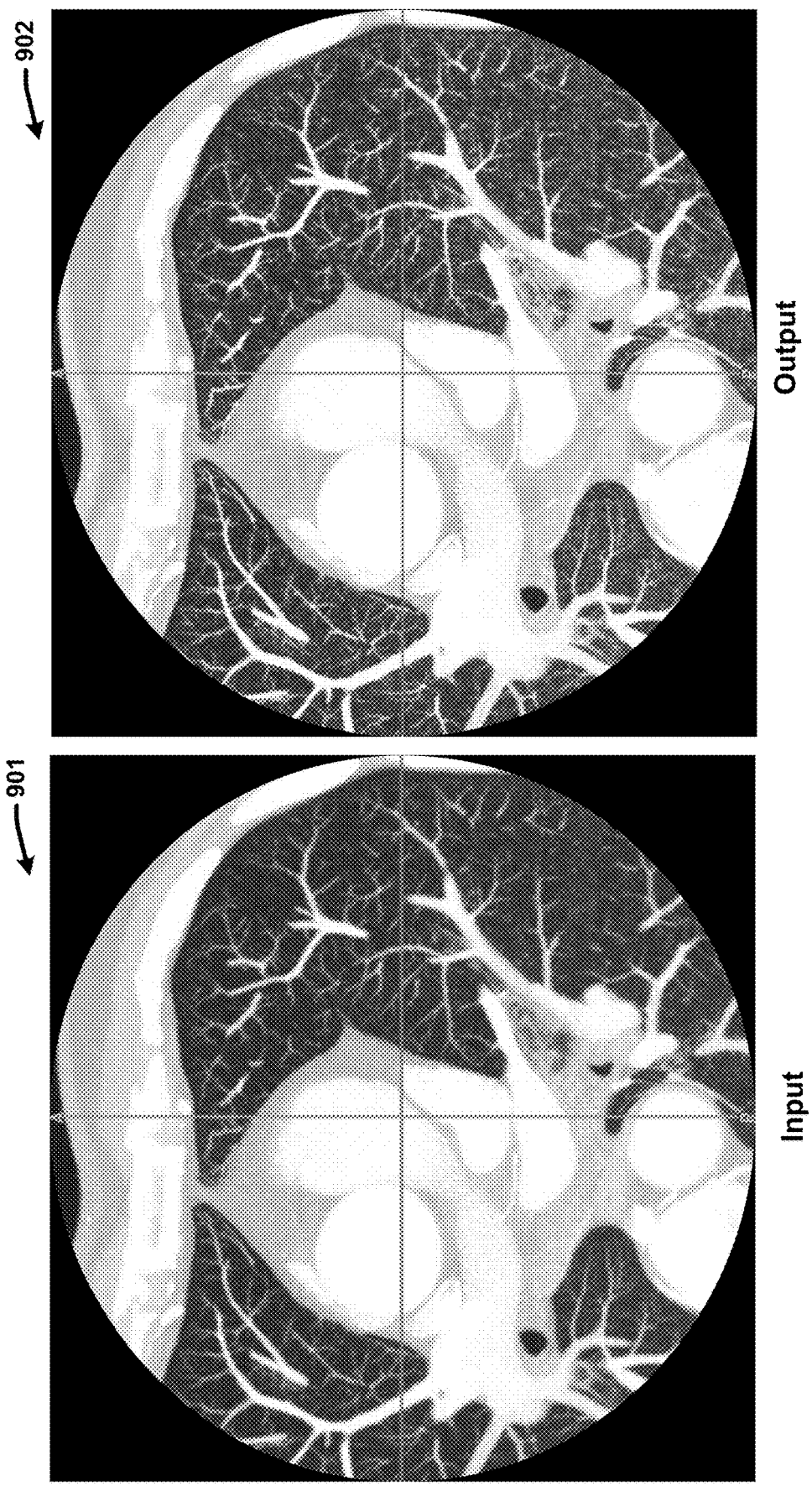

FIGS. 7-9 present clinical MTF CT images before and after application of the disclosed enhancement model $106_2$ in accordance with one or more embodiments of the disclosed subject matter. The CT images shown in FIGS. 7-9 are respectively oriented in the axial direction and generated with an enhancement model $106_2$ using process 400, wherein the enhancement model was trained on images in the z-direction.

FIG. 7 depicts a CT scan image of coronary artery with a stent pre-enhancement (e.g., input image 701) and post-enhancement (e.g., output image 702) using the trained enhancement model $106_2$. The stent is indicated with a dashed white circle in both images. As can be seen by comparison of the respective input and output images, the stent in the output image 702 (as well as other visual features) has a sharper/enhanced quality relative to the stent in the input image 701. For example, the stent strands and other features are clearly distinguishable (e.g., separable) in the output image 702 while they are not in the input image 701. In addition, the output image 702 and the input image 701 are otherwise the same in appearance (e.g., the enhanced image is not a distorted version of the enhanced image). In particular, the noise characteristics and the inter-tissue contrast characteristics of the respective images are the same.

FIG. 8 depicts another CT scan image pre-enhancement (e.g., input image 801) and post-enhancement (e.g., output image 802) using the trained enhancement model $106_2$. As can be seen by comparison of the respective input and output images, the visual features of the output image 802 have a sharper/enhanced quality relative to the input image 801. In addition, the output image 802 and the input image 801 are otherwise the same in appearance (e.g., the enhanced image is not a distorted version of the enhanced image). In particular, the noise characteristics and the inter-tissue contrast characteristics of the respective images are the same.

FIG. 9 depicts another CT scan image pre-enhancement (e.g., input image 1001) and post-enhancement (e.g., output image 1002) using the trained enhancement model $106_2$. As can be seen again by comparison of the respective input and output images, the visual features of the output image 1002 have a sharper/enhanced quality relative to the input image 1001. In addition, the output image 1002 and the input image 1001 are otherwise the same in appearance (e.g., the enhanced image is not a distorted version of the enhanced image). In particular, the noise characteristics and the inter-tissue contrast characteristics of the respective images are the same.

Figure 10:
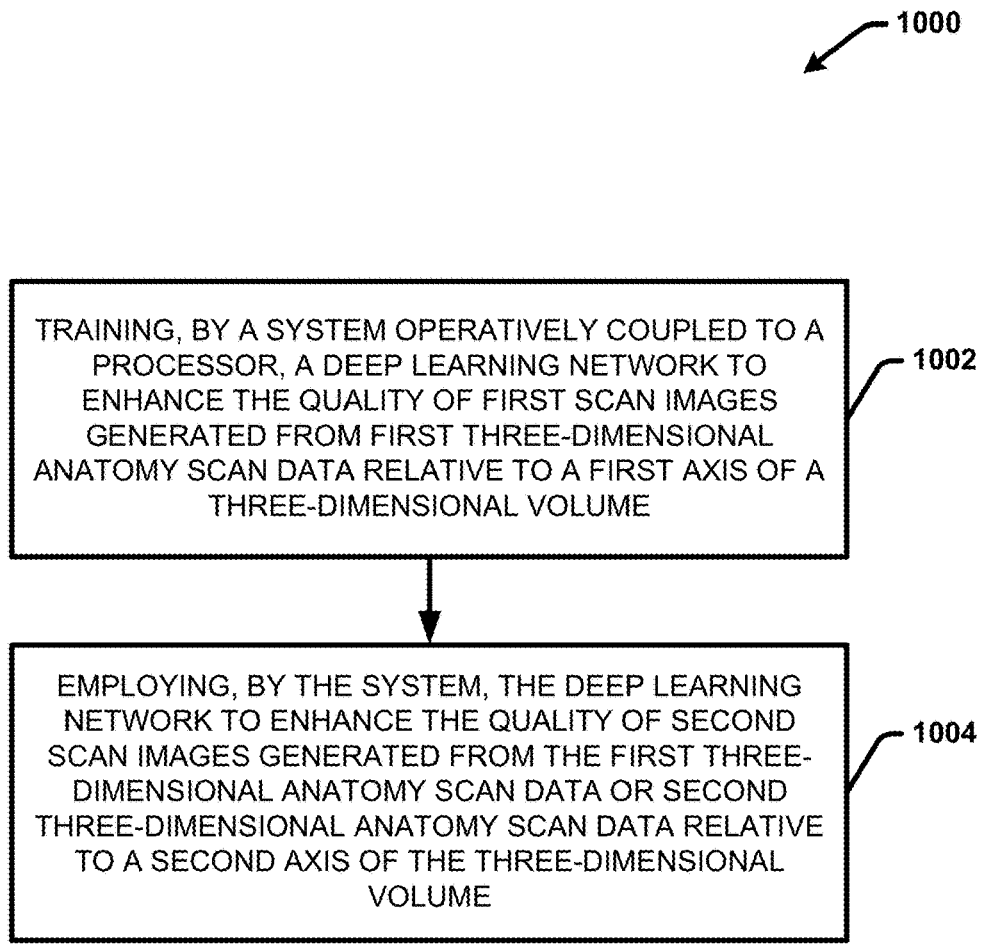
FIG. 10 presents a high-level flow diagram of a high-level flow diagram of an example computer-implemented process for enhancing the quality of 3D anatomy scan images using deep learning in accordance with one or more embodiments of the disclosed subject matter.

FIG. 10 presents a high-level flow diagram of an example computer-implemented process 1000 for enhancing the quality of 3D anatomy scan images using deep learning. Repetitive description of like elements employed in respective embodiments is omitted for sake of brevity.

In accordance with process 1000, at 1002 a system operatively coupled to a processor (e.g., system 100 or the like), trains (e.g., via training component 104) a deep learning network (e.g., enhancement model $106_1$) to enhance the quality of first scan images generated from first 3D anatomy scan data relative to a first axis of a 3D volume. At 1004, once trained, the system employs (e.g., via enhancement component 110) the deep learning network (e.g., enhancement model $106_2$) to enhance the quality of second scan images generated from the first 3D anatomy scan data or second 3D anatomy scan data relative to a second axis of the 3D volume. The enhanced scan images may be rendered via display, stored, exported to another system, and so on.

Figure 11:
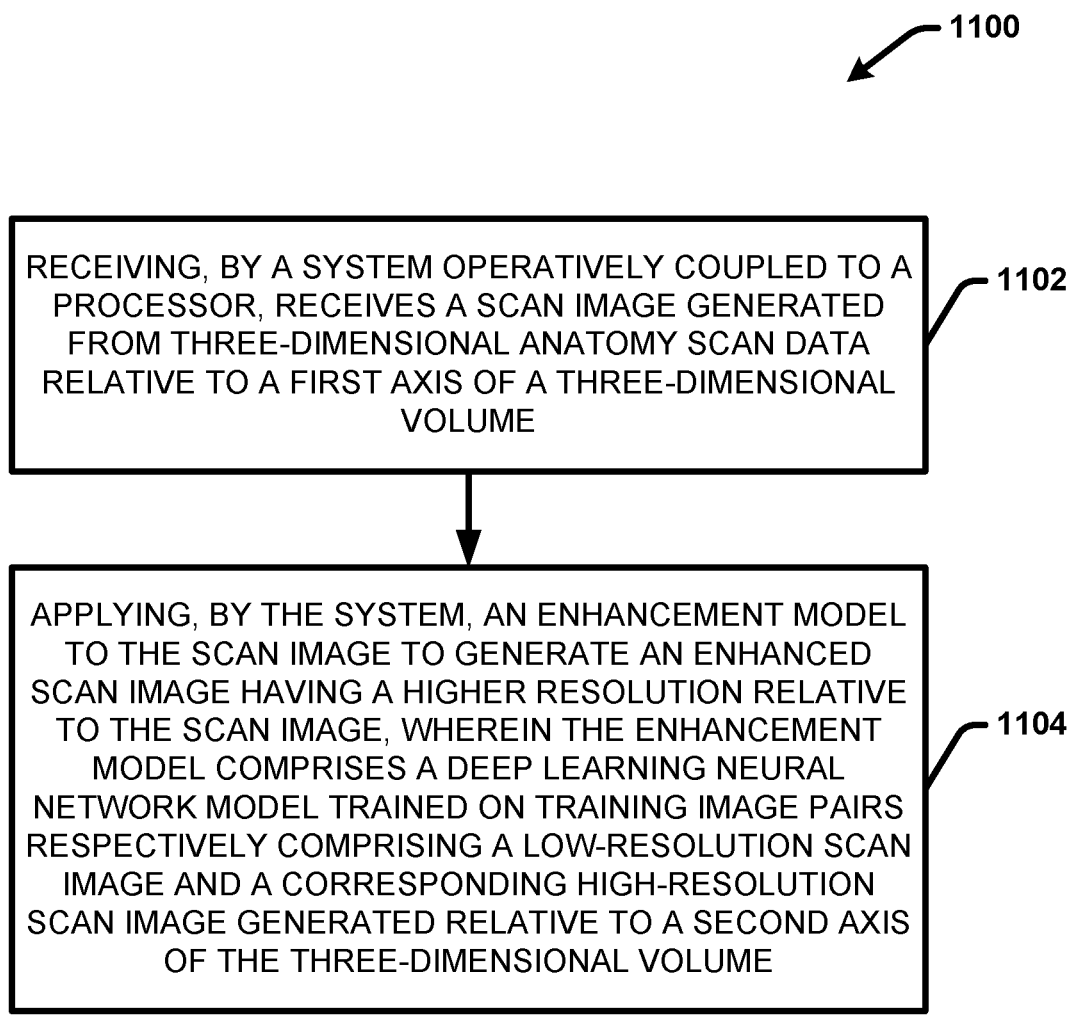
FIG. 11 presents a high-level flow diagram of a high-level flow diagram of another example computer-implemented process for enhancing the quality of 3D anatomy scan images using deep learning in accordance with one or more embodiments of the disclosed subject matter.

FIG. 11 presents a high-level flow diagram of another example computer-implemented process 1100 for enhancing the quality of 3D anatomy scan images using deep learning. Repetitive description of like elements employed in respective embodiments is omitted for sake of brevity.

In accordance with process 1100, at 1102 a system operatively coupled to a processor (e.g., system 100 or the like) receives (e.g., via reception component 102) a scan image generated from 3D anatomy scan data relative to a first axis of a 3D volume (e.g., scan image 124). At 1104, the system applies (e.g., via enhancement component 110) an enhancement model (e.g., enhancement model $106_2$) to the scan image to generate an enhanced scan image having a higher resolution relative to the scan image (e.g., enhanced scan image 126), wherein the enhancement model comprises a deep learning neural network model trained on training image pairs respectively comprising a low-resolution scan image and a corresponding high-resolution scan image respectively generated relative to a second axis of the 3D volume. The enhanced scan images may be rendered via display, stored, exported to another system, and so on.

Example Operating Environment

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 12, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 12:
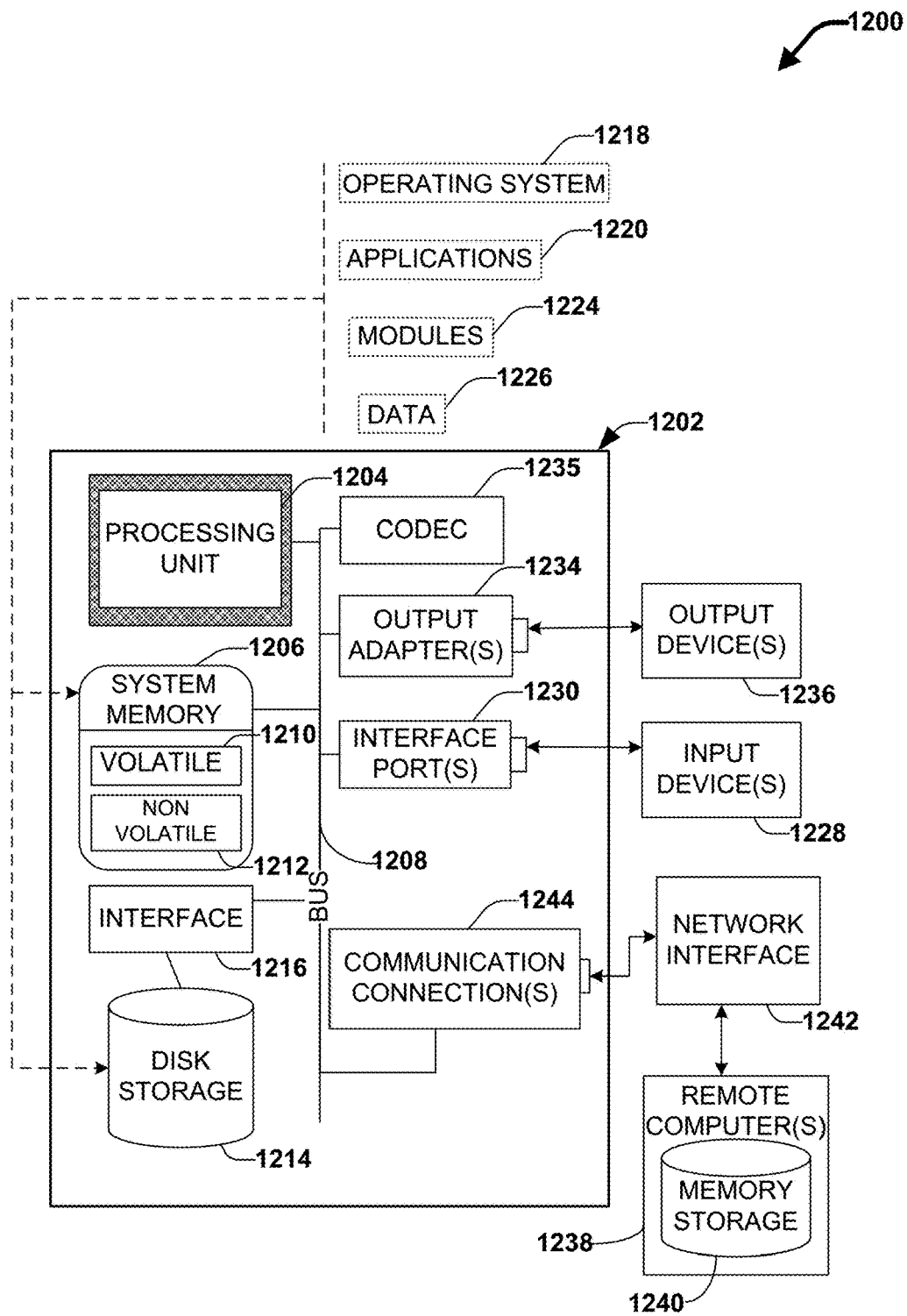
FIG. 12 illustrates a block diagram of an example, non-limiting operating environment in which one or more embodiments described herein can be facilitated.

With reference to FIG. 12, an example environment 1200 for implementing various aspects of the claimed subject matter includes a computer 1202. The computer 1202 includes a processing unit 1204, a system memory 1206, a codec 1235, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1294), and Small Computer Systems Interface (SCSI).

The system memory 1206 includes volatile memory 1210 and non-volatile memory 1212, which can employ one or more of the disclosed memory architectures, in various embodiments. The basic input/output system (BIOS), containing the basic routines to transfer information between elements within the computer 1202, such as during start-up, is stored in non-volatile memory 1212. In addition, according to present innovations, codec 1235 can include at least one of an encoder or decoder, wherein the at least one of an encoder or decoder can consist of hardware, software, or a combination of hardware and software. Although, codec 1235 is depicted as a separate component, codec 1235 can be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1212 can employ one or more of the disclosed memory devices, in at least some embodiments. Moreover, non-volatile memory 1212 can be computer memory (e.g., physically integrated with computer 1202 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1210 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1202 can also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD), flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1214 to the system bus 1208, a removable or non-removable interface is typically used, such as interface 1216. It is appreciated that disk storage 1214 can store information related to a user. Such information might be stored at or provided to a server or to an application running on a user device. In one embodiment, the user can be notified (e.g., by way of output device(s) 1236) of the types of information that are stored to disk storage 1214 or transmitted to the server or application. The user can be provided the opportunity to opt-in or opt-out of having such information collected or shared with the server or application (e.g., by way of input from input device(s) 1228).

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port can be used to provide input to computer 1202 and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a reception component that receives a scan image generated from three-dimensional scan data along a first axis of a three-dimensional volume; and
an enhancement component that applies an enhancement model to the scan image to generate an enhanced scan image having a higher resolution relative to the scan image, wherein the enhancement model comprises a deep learning neural network model trained on training image pairs respectively comprising a low-resolution scan image and a corresponding high-resolution scan image respectively generated along a second, angularly distinct axis of the three-dimensional volume.

2. The system of claim 1, wherein the low-resolution scan image comprises a thick slice scan image and the corresponding high-resolution scan image comprises a corresponding thin slice scan image generated using retro-reconstruction.

3. The system of claim 1, wherein the low-resolution scan image and the corresponding high-resolution scan image were generated using focal spot wobbling.

4. The system of claim 1, wherein the low-resolution scan image was generated without a comb filter and the corresponding high-resolution scan image was generated with the comb filter.

5. The system of claim 1, wherein the low-resolution scan image comprises a first scan image generated using a low-resolution scanner and the corresponding high-resolution scan image comprises a corresponding second scan image generated using a high-resolution scanner.

6. The system of claim 1, wherein computer executable components further comprise:
a training component that employs supervised machine learning to train the enhancement model to learn and perform a deblurring transformation between the training image pairs under a deblur constraint based on one or more point spread function characteristics associated with the first axis.

7. The system of claim 1, wherein the enhanced scan image resolution exceeds the maximum resolution of the imaging system on which the image was scanned along any axis of the three-dimensional image volume.

8. The system of claim 1, wherein the enhanced scan image can have a same size or a larger size in comparison to the input image.

9. The system of claim 1, wherein the enhancement model is separable in one-dimension, two-dimensions and three-dimensions.

10. The system of claim 1, wherein computer executable components further comprise:
a training component that employs supervised machine learning to train the enhancement model to deconvolve point spread function using constraints driven by tissue features, contrast features and spatial features between the training image pairs under one or more defined constraints.

11. The system of claim 10, wherein the one or more defined constraints include at least one of, an intensity threshold constraint, a mask constraint, a spatial constraint, or contrast distribution constraint.

12. The system of claim 11, wherein the training component employs one or more loss functions to preserve the one or more defined constraints, the one or more loss functions can be a mean absolute error loss function, a percentage loss function, a perceptual loss function, an adversarial loss function, and a point spread characteristics constraining loss function.

13. The system of claim 1, wherein the scan image is selected from the group consisting of: a computed tomography image, a multi-energy computed tomography image, and a magnetic resonance image.

14. A method comprising:
receiving, by a system operatively coupled to a processor, receives a scan image generated from three-dimensional scan data along a first axis of a three-dimensional volume; and
applying, by the system, an enhancement model to the scan image to generate an enhanced scan image having a higher resolution relative to the scan image, wherein the enhancement model comprises a deep learning neural network model trained on training image pairs respectively comprising a low-resolution scan image and a corresponding high-resolution scan image respectively generated along a second, angularly distinct axis of the three-dimensional volume.

15. The method of claim 14, wherein the low-resolution scan image comprises a thick slice scan image and the corresponding high-resolution scan image comprises a corresponding thin slice scan image generated using retro-reconstruction.

16. The method of claim 14, wherein the low-resolution scan image and the corresponding high-resolution scan image were generated using focal spot wobbling or via scanning the same structure using different scanners respectively comprising a low-resolution scanner and a high-resolution scanner.

17. The method of claim 14, further comprising:
employing, by the system, supervised machine learning to train the enhancement model to learn and perform a deblurring transformation between the training image pairs under a deblur constraint based on one or more point spread function characteristics associated with the first axis.

18. The method of claim 14, further comprising:
training, by the system, the enhancement model to deconvolve point spread function using constraints driven by tissue features, contrast features and spatial features between the training image pairs under one or more defined constraints and one or more loss functions to preserve the one or more defined constraints, the one or more loss functions can be a mean absolute error loss function, a percentage loss function, a perceptual loss function, an adversarial loss function, and a point spread characteristics constraining loss function.

19. A machine-readable storage medium, comprising executable instructions that, when executed by a processor, facilitate performance of operations, comprising:
training a deep learning network to enhance the quality of first scan images generated from first three-dimensional scan data along a first axis of a three-dimensional volume; and
employing the deep learning network to enhance the quality of second scan images generated from the first three-dimensional anatomy scan data or second three-dimensional anatomy scan data along a second, angularly distinct axis of the three-dimensional volume, wherein the deep learning network is trained on training image pairs respectively comprising a low-resolution scan image and a corresponding high-resolution scan image respectively generated along the second, angularly distinct axis of the three-dimensional volume.

20. The machine-readable storage medium of claim 19, wherein the training comprises training the deep learning network to learn one or more transformations between training image pairs respectively comprising a low-resolution scan image and a corresponding high-resolution scan image respectively generated along the first axis of the three-dimensional volume, and wherein the one or more transformation comprise a deblurring transformation between the training image pairs under a deblur constraint based one or more point spread function characteristics associated with the second, different axis.

* * * * *